Figure 1:
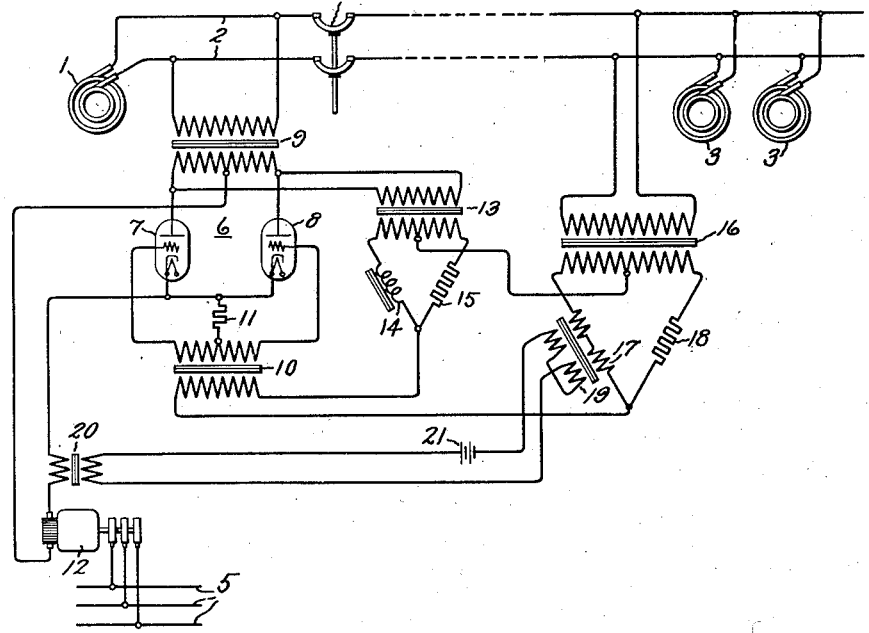

July 4, 1933.   E. F. W. ALEXANDERSON   1,917,081
SYSTEM OF ELECTRIC POWER TRANSMISSION
Filed Dec. 16, 1931    2 Sheets-Sheet 1

Inventor:
Ernst F. W. Alexanderson,
by Charles E. Tullar
His Attorney.

July 4, 1933.  E. F. W. ALEXANDERSON  1,917,081
SYSTEM OF ELECTRIC POWER TRANSMISSION
Filed Dec. 16, 1931  2 Sheets-Sheet 2
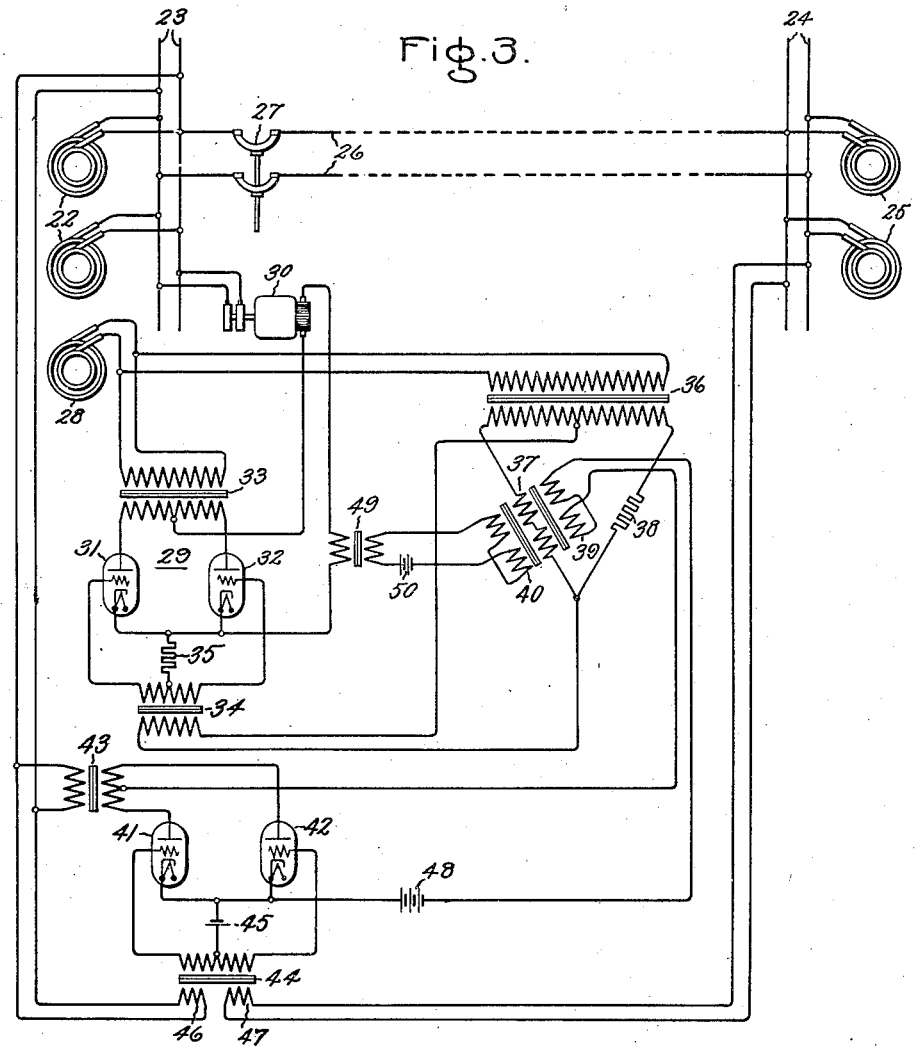
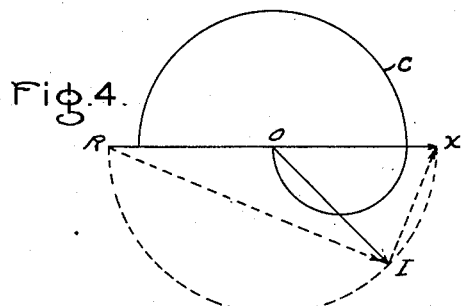
Inventor:
Ernst F. W. Alexanderson,
by Charles E. Tullar
His Attorney.

Patented July 4, 1933

1,917,081

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

SYSTEM OF ELECTRIC POWER TRANSMISSION

Application filed December 16, 1931. Serial No. 581,366.

My invention relates to systems of electric power transmission and more particularly to the transmission of electric power between synchronous machines.

In modern power systems generating stations representing an aggregate power of millions of kilowatts are tied together by lines which must transmit large amounts of synchronizing power in order to insure synchronous stability of the whole network. Various means have been employed to insure reliability and continuity of service in distribution networks such as improved excitation systems, changes in the design of transmission lines and terminal apparatus, improved switching and relay protection, and independent power sources. In systems utilizing independent power sources the generators supply power to a secondary network without the provision of tie lines. The only connection between the generators in this case is the secondary network which represents a high reactance and resistance in the completed circuit. The synchronizing power that may be exchanged between the several generators through the secondary distribution system is therefore very low and synchronism is difficult to maintain. Furthermore in the case of a disturbance when the generators have fallen out of synchronism the secondary network must carry the exchange of short circuit current between the generators which may be severe enough to damage the network and result in interruption of service.

In long straightaway power transmission lines of the order of a quarter wave length the problem of transmitting power between synchronous machines becomes more acute. Such lines are completely lacking in synchronizing power and are definitely unstable for transmitting power between synchronous terminal apparatus.

It is an object of my invention to provide a new and improved system for the transmission of electric power.

It is another object of my invention to provide a new and improved system of transmitting power between synchronous machines.

It is a further object of my invention to provide new and improved means for controlling power system stability.

It is another object of my invention to provide a new and improved system for the transmission of power between synchronous apparatus without relying upon the power transmission conductors for transmitting synchronizing forces between the synchronous apparatus of the system.

A still further object of my invention is the provision of improved reactance control apparatus that may be readily operated to vary an operating condition of the system in accordance with the phase relation between a pair of electrical quantities of the system.

In accordance with my invention I provide a system of synchronous power transmission in which the transmission line is not depended upon for furnishing the synchronizing power. The synchronization is attained artificially through an auxiliary means or circuit, such as a communication channel provided by wire, radio, or any angular motion transmitting means, which causes changes in power flow in a branch power circuit in a manner to maintain synchronism in accordance with the angular relation between the tranmitting and receiving machines. In accordance with one embodiment of my invention I provide a power absorbing circuit connected to the generator bus and controlled so that the amount of power absorbed is varied in accordance with the departure from a predetermined phase relation between the voltages of the generator and receiver buses to prevent the phase relation from shifting beyond the limiting angle for stable operation. In accordance with another embodiment of my invention the generating means comprises a synchronous generator or generators to be maintained in synchronism with the receiving machine or machines and an auxiliary generating means operated in speed and phase, independent of the main generators, for varying the aggregate power input to the generating bus in accordance with the phase relation of voltages between the generator and receiver buses.

Figure 2:
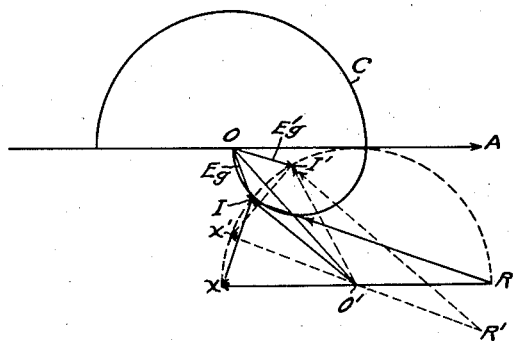

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawings in which Fig. 1 is a diagrammatic representation of one embodiment of my invention utilizing a power absorbing circuit; Fig. 2 is a diagram to aid in the understanding of the operating cycle of the control means of the arrangement illustrated in Fig. 1; Fig. 3 is a diagrammatic representation of another embodiment of my invention utilizing a variable power source, and Fig. 4 is a diagram to aid in the understanding of the operating cycle of the control means of the arrangement illustrated in Fig. 3.

In Fig. 1 of the drawings I have illustrated a transmission system comprising a source of alternating current diagrammatically represented as a synchronous generator 1, a transmission line represented by the conductors 2 and a receiving circuit represented by synchronous machines 3 which may be taken to represent similar generators or motors. A conventional circuit interrupting means in the transmission line is represented by the switch 4. A power absorbing circuit represented by the conductors 5 is connected across the conductors 2, preferably near the generator terminals or to the generator bus, through controllable rectifying means 6 for varying the amount of power absorption. As illustrated the rectifying means comprises electric discharge devices 7 and 8 each comprising an anode, a cathode and a control electrode or grid and preferably of the vapor electric discharge type in which the starting of current through the device is controlled in accordance with the phase relation between the anode and grid potentials. The valves 7 and 8 are connected in the conventional manner to the circuit 2 through a transformer 9 for obtaining full wave rectification. The grids of the valves are connected to their common cathode circuit through opposite halves of the secondary winding of a grid transformer 10 and a current limiting resistor 11. The absorbing circuit 5 is connected to the midpoint of the secondary winding of transformer 9 and to the cathode circuit of the valves. The absorbing means may be any static or dynamic means but as illustrated I have shown the alternating power circuit 5 as a translating circuit which may be operated with a variable power input and have provided a synchronous converter 12 for transforming the rectified power from the valve circuit to the alternating power absorbing circuit 5.

In order to maintain synchronism between the dynamo-electric machines 1 and 3 the average power absorbed is varied in accordance with the departure from synchronism. For this purpose I provide a grid potential for the valves 7 and 8 which varies in accordance with the phase relation between the machine voltages. The grid potential is the resultant of a voltage component corresponding to the generator voltage and a voltage component corresponding to the receiver voltage. In order to obtain gradual control of the valves the resultant grid potential is varied between an in-phase relation and a quadrature relation with the anode potential of the valves so that the valves pass current during substantially all of the cycle for the in-phase relation, substantially no current during the quadrature relation, and corresponding varying portions of each cycle for intermediate phase relations between these limits.

To obtain the resultant grid potential I provide means for deriving a potential from the generator 1 through an impedance phase shifting circuit including a transformer 13 having a primary winding connected to the generator 1 and a secondary winding connected to energize a serially connected reactor 14 and resistor 15. One terminal of the secondary winding of grid transformer 10 is connected to the junction between reactor 14 and resistor 15. Means are also provided for deriving a potential from the machines 3 through an impedance phase shifting circuit including a transformer 16 having a primary winding connected to the machines 3 and a secondary winding connected to energize a serially connected saturable reactor 17 and a resistor 18. The saturable tractor 17 is provided with a saturating winding 19 which is connected to be energized in accordance with the current flowing in the absorbing circuit through a current transformer 20 connected to be responsive to direct current transients and a battery 21, for providing anti-hunting features to be described later. The remaining terminal of the secondary winding of grid transformer 10 is connected to the junction between the reactor 17 and resistor 18. The midpoints of transformers 13 and 16 of the phase shifting circuits are connected together so that the energization of grid transformer 10 is the resultant of the two voltage components from the respective phase shifting circuits.

The operation of the above described apparatus will be better understood by reference to Fig. 2 in which the vector OA represents the voltage applied to the anodes of the electric valves 7 and 8 and the curve C represents the polar diagram of the average output of such a rectifying apparatus for various phase angles of grid potential. When the load circuit of the rectifier is inductive, as is the case in the various arrangements utilized in the illustrated embodiments of the invention, the average power output of the rectifier will be reduced to zero when the grid potential is retarded substantially 90 electrical degrees. It will be noted that for any angle of lead of the grid potential up to 180 degrees lead the output of the rectifier will remain constant at its maximum value, while for values of this phase angle between 90 degrees lagging and 180 degrees lagging the average output of the rectifier is zero.

In accordance with my invention the resultant grid potential $E_g$ is represented by the vector OI which may be shifted from substantially 90 degrees lag to the in-phase position. The vector OI is the resultant of the vector OO' and the vector O'I. The vector OO' is the voltage component derived from the generator 1 and is shifted to the illustrated position by means of the phase shifting means energized from transformer 13 at the generator end of the line. The vector O'I is the voltage component derived from the phase shifting circuit energized from the transformer 16 at the receiver end of the line. The vector XR representing the voltage of the secondary winding of transformer 16 is reversed in phase with respect to the vector OA and is laid off at the point O' on the vector OO'. The point O' corresponding to the midpoint of the transformer 16. The total vector XR is made up of a resistance component RI and a reactance component XI. The voltage component corresponding to the potential between the midpoint of the transformer 16 and the junction point of reactor 17 and resistor 18 is the vector O'I. For the normal load conditions and angular relation to be maintained between the generator and receiver stations the phase shifting circuits are adjusted so that the generator vector OO' and vector O'I are in phase opposition and the resultant vector OI is lagging substantially 90 degrees. When the generator voltage tends to exceed the desired operating angle between the generator and receiver voltages the angular relation between the anode and grid potentials of the valves 7 and 8 is shifted. For purposes of illustration I have shown the relative shift in phase relation as if the generator voltage were fixed and the receiver voltage shifted so that the vector XR shifts in phase as illustrated by the dotted line vector X'R'. As a result the resultant vector OI is shifted more nearly in phase with the anode potential of the valves to the position OI' in a manner to increase the average output of the rectifying circuit and thereby the amount of power absorbed.

The operation of the embodiment of my invention illustrated in Fig. 1 is as follows: It will be assumed that generator 1 is being operated by any suitable prime mover (not shown) and is delivering a given load to the machines 3 and that the kilowatt demand on the generator is suddenly decreased by a fault causing opening of the circuit breaker 4 or a short circuit between the generator and its load. The removal of load will cause the generator to tend to speed up and advance in phase from its previous load position. However, if the average kilowatt output of the generator is maintained substantially the same as before the fault the phase relation between the generator voltage and the receiver voltage will remain the same as before the fault. In accordance with my invention the average power absorbed by the power absorbing circuit is varied in a manner to maintain a predetermined relation with respect to the machines 3.

The cycle of operation whereby the variation in the power absorbed in the rectifier circuit is effected to maintain a predetermined phase relationship between the generator and receiver voltage will be better understood by reference to Fig. 2. Assuming the circuit breaker 4 to be closed and the system to be operating in a state of equilibrium under steady state conditions. The vector OA represents the anode potential of the valves 7 and 8 and also the phase position of the generator voltage. The vector XR represents the phase position of the receiver circuit and the vector OI represents the resultant grid potential $E_g$ applied to the valves. Under these conditions it will be assumed that no power is being transmitted through the rectifier arrangement to the power absorbing circuit 5. In case the load is suddenly removed, as by the opening of circuit breaker 4 or any other cause increasing the impedance between the machine voltages, the generator voltage will tend to advance in phase, or, looking at the change in another way, the receiver voltage will tend to be retarded so that the vector XR will move to the position X'R'. Under this new condition, it is seen that the grid potential, now $E'_g$, is advanced to the position OI' and more nearly in phase with the anode potential of the valve. As a result the valves 7 and 8 conduct current for a greater portion of each cycle and the average power absorbed is increased. This compensating load on the generator tends to slow it down and bring the angular relationship between the generator and receiver voltages back to the normal condition.

When the power absorbed is suddenly increased from one value to another a direct current transient induces a voltage in the circuit of the saturating winding of the reactor 17. When the reactor 17 is more nearly saturated the reactance decreases and hence the vector XI decreases. This causes an increase in the lag of the grid potential in opposition to the decreased lag occasioned by the slowing down of the generator so that there is a reactionary force introduced tending to prevent oscillation of the power absorbed. The battery 21 is employed to effect an opposite change in the saturation of the reactor depending upon whether the power absorption is increased or decreased. Thus upon an increase in the power absorbed the voltage transient is arranged to act cumulatively with the battery to increase the saturation of the reactor and thereby decrease the reactance and tend to increase the lag of the grid voltage when it is decreasing. On the other hand with a decrease in the power absorbed the voltage transient acts differentially with the battery to decrease the saturation of the reactor and thereby increase the reactance and tend to decrease the lag of the grid voltage when it is increasing.

In Fig. 3 I have shown an embodiment of my invention in which I employ a variable power supply means instead of a power absorbing means which is controlled in accordance with the phase relation between the generator and receiver stations. The generating station as illustrated comprises two synchronous generators 22 connected to a generator bus 23 which is connected to be operated in synchronism with a receiver bus 24 having two synchronous machines 25 connected thereto through a transmission line 26. A conventional circuit interrupting device is represented by the switch 27. An auxiliary generator 28 is arranged to be operated in speed and phase, independent of the generator bus voltage, and is connected to the generator bus through controllable rectifying apparatus 29 and an inverting apparatus illustrated as a synchronous inverter 30. The rectifying apparatus comprises electric discharge devices 31 and 32 each comprising an anode, a cathode, and a control electrode or grid, preferably of the vapor electric discharge type in which the starting of current through the device is controlled in accordance with the phase relation between the anode and grid potentials. The valves 31 and 32 are connected in the conventional manner to the generator 28 through a transformer 33 for obtaining full wave rectification. The grids of the valves are connected to their common cathode circuit through opposite halves of the secondary winding of a grid transformer 34 and a current limiting resistor 35. The direct current terminals of the synchronous inverter are connected to the midpoint of the secondary winding of transformer 33 and to the cathode circuit of the valves 31 and 32.

In order to maintain a predetermined phase relation between the generator bus 23 and the receiver bus 24 the average power input to the bus 23 is varied in accordance with the departure from a predetermined phase relation between the voltages of the buses 23 and 24. For this purpose I provide a grid potential for the valves 31 and 32 which varies in accordance with the phase relation between the bus voltages. As illustrated the grid potential is obtained from an impedance phase shifting circuit including a transformer 36 having a primary winding connected to the generator 28 and a secondary winding connected to energize a serially connected saturable reactor 37 and a resistor 38. The saturable reactor 37 is provided with a saturating winding 39 which is energized in accordance with variations in phase of the generator and receiver voltages and a saturating winding 40 which is energized in accordance with direct current transients in the output circuit of the rectifier arrangement for preventing hunting. The midpoint of the secondary winding of transformer 36 and the junction between reactor 37 and resistor 38 is connected to the primary winding of grid transformer 34 with the variable control potential derived from the impedance phase shifting circuit.

The grid control potential is varied in phase with respect to the anode potential of the valves in accordance with variation in energization of the saturating windings 39 and 40. The saturating winding 39 is connected to be energized from the output circuit of a rectifier arrangement comprising electric discharge devices 41 and 42 each comprising an anode, a cathode and a control electrode or grid. The devices 41 and 42 are preferably of the vapor discharge type in which control is effected by variations in the phase relation of the grid and anode potentials and are connected to be energized from the generator bus 23 through the transformer 43 for obtaining full wave rectification. The grids of these valves are connected to their common cathode circuit through opposite halves of the secondary winding of a grid transformer 44 and a bias battery 45. The primary circuit of the grid transformer 44 comprises two windings 46 and 47. The winding 46 is connected to be energized in accordance with the voltage of the generator bus 23 and the winding 47 is connected to be energized in accordance with the voltage of the receiver bus 24. The saturating winding 39 is connected to the electrical midpoint of transformer 43 and to the common cathode circuit of the valves 41 and 42 through a battery 48. Variations in the phase relation between the respective buses changes the energization of the secondary winding of transformer 44 in a manner to vary the output of the rectifiers 41 and 42 and thereby the energization of the saturating winding 39.

The energization of the saturating winding 40 is controlled in accordance with direct current transients in the output circuit of the rectifier 29 by means of a current transformer 49 connected in series relation with the direct current side of the synchronous converter 30. The secondary winding of transformer 49 is connected to the winding 40 through a battery 50 which is so arranged that the degree of saturation of winding 40 is increased when the current transient is the result of an increase in current and is decreased when the current transient is a result of a decrease in current.

The operation of the arrangement illustrated in Fig. 3 will be better understood by reference to Fig. 4 in which the vector OX represents the voltage applied to the anodes of the electric valves 31 and 32 and the curve C represents the polar diagram of the average output of such a rectifying apparatus for various phase angles of grid potential. The vector RX which represents the total voltage across the transformer 36 comprises two components of voltage XI and RI which represent the magnitude and phase of the voltages across the reactor 37 and resistor 38 respectively. The vector OI is the voltage component derived from the midpoint of the transformer 36 and the junction of the reactor 37 and resistor 38. With a relatively high reactance the resultant vector OI is shifted to a lagging position with respect to the anode voltage and as illustrated is shifted to substantially the 90 degree position where with an inductive output circuit for the valves the average output is substantially zero. If the inductance is decreased by an increase in energization of the saturating winding the vector OI is shifted more nearly in phase with its anode voltage and the average output is substantially at its maximum value.

The operation of the embodiment of my invention illustrated in Fig. 3 is as follows: It will be assumed that generators 22 and 28 are being operated by suitable prime movers and that the three generators are delivering to the bus 23 an amount of power equal to the power demand and that under this condition the phase relation between the buses 23 and 24 is that value to be maintained. If the power demand varies either due to load added or dropped at the bus 24 so as to tend to shift the phase relation between the generator and receiver bus voltages beyond the critical angle for synchronous operation the input to the generator bus supplied by generator 28 will be varied in accordance with change in phase relation of the respective buses. Thus, if the power demand decreases and the generators 22 tend to advance in phase the aggregate power input to the bus is decreased sufficiently to hold the generators 22 at the given phase position. In accordance with the illustrated embodiment of my invention a tendency of the generator bus voltage to advance in phase causes the grid voltages of the valves 41 and 42 to change so as to decrease the anode current of the valves and thereby the energization of the saturating winding 39 of the phase shifting circuit. With a decrease in saturation the vector XI of Fig. 4 is increased in magnitude and the grid voltage of the valves 31 and 32 is retarded in phase. As a result the average power output of the rectifier 29 is decreased and the power input to the bus 23 is decreased. With a decrease in the aggregate power input to the generator bus the power supply to the generator may be made more nearly equal to the power demand so that the generators 22 may be maintained in the given phase position. Upon the occurrence of a decrease in the rectifier output a direct current transient energizes the secondary winding of transformer 49 in such a direction with respect to the polarity of the battery 50 as to increase the saturation of the saturating winding 40 of the impedance phase shifting circuit. As a result a reactionary force is introduced tending to prevent the general decrease in power supply by generator 28 from causing oscillations in power input.

Similarly, if the power demand increases and the generator bus voltage tends to be retarded in phase the resultant energization of transformer 44 is such as to increase the anode current of valves 41 and 42 and thereby increase the saturation of the saturating winding 39 in the phase shifting circuit. With an increase in saturation of the reactor 37 the grid potential of valves 31 and 32 is advanced in phase and the output of the rectifier 29 is increased so that the aggregate power input to the generator bus is made more nearly equal to the power demand and the generator bus voltage may be maintained in the given position. Upon the occurrence of an increase in the rectifier output a direct current transient energizes the secondary winding of transformer 49 in such a direction with respect to the polarity of battery 50 as to decrease the saturating current of winding 40 of the impedance phase shifting circuit. As a result a reactionary force is introduced tending to prevent the general increase in power supply by generator 28 from causing oscillations in power input.

While I have described but two embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. In combination, a plurality of synchronous dynamo-electric machines, electrical connections between said machines, a variable power circuit connected to one of said machines for retarding or accelerating said machine upon any tendency to depart from synchronism and means independent of synchronizing forces transmitted by said electrical connections and responsive to any departure from synchronism of said machines for varying the interchange of power between said variable power circuit and the machine associated therewith.

2. In a system of distribution, remotely situated synchronous dynamo-electric machines, a power transmission circuit interconnecting said machines, a branch power circuit connected to one of said machines, a circuit independent of synchronizing forces transmitted by said power circuit and responsive to the angular relation between voltages of the respective machines for varying the interchange of power between said branch power circuit and the machine associated therewith.

3. In a system of distribution, remotely situated synchronous dynamo-electric machines, a power transmission circuit interconnecting said machines, a power absorbing circuit connected to one of said machines, and means independent of synchronizing forces transmitted by said power transmission circuit and responsive to any departure from synchronism of said machines for varying the power absorbed in said power absorbing circuit in a manner to maintain a synchronous relation between said machines.

4. In a system of distribution, remotely situated synchronous dynamo-electric machines, a power transmission circuit interconnecting said machines, an auxiliary power generating means connected to supply power to said transmission circuit in combination with one of said synchronous machines, and means responsive to any departure from synchronism of said synchronous machines for varying the power input of said auxiliary power generating means in a manner to maintain a synchronous relation between said synchronous machines.

5. In a system of distribution, remotely situated synchronous dynamo-electric machines, a power transmission circuit interconnecting said machines, an auxiliary power generating means operated in speed and phase independent of said synchronous machines for varying the aggregate power input to said power transmission circuit, and means responsive to the angular relation between the voltages of said synchronous machines for controlling said auxiliary power generating means in accordance with the departure from synchronism of said synchronous machines.

6. In combination, means for producing a plurality of voltages which are relatively variable in phase, a saturable reactor for controlling the operation of said means, and means for varying the saturation of said reactor in accordance with relative variations in phase between said voltages.

7. In combination, two devices having electric quantities respectively which are variable in phase, a saturable reactor for controlling the operation of said devices, and means for varying the saturation of said reactor in accordance with the relative phase displacement of said quantities.

8. In combination, two electric circuits having voltages respectively which are variable in phase, a saturable reactor for controlling one of said circuits, and means for varying the saturation of said reactor in accordance with the phase relation between the voltages of said circuits.

9. In combination, a plurality of electric circuits, an electric valve operatively associated with one of said circuits for effecting control thereof, a saturable reactor for controlling said valve, and means for varying the saturation of said reactor in accordance with relative variations in phase between electric quantities of said circuits.

10. In combination, two synchronous dynamo-electric machines, electrical connections between said machines, a branch power circuit connected to one of said machines, electric discharge means for varying the power flow in said branch power circuit, and means for controlling said electric discharge means in accordance with any departure from synchronism of said machines.

11. In a system of distribution, remotely situated synchronous dynamo-electric machines, a power transmission circuit interconnecting said machines, a power absorbing circuit connected to one of said machines, electric discharge means in circuit with said power absorbing means for varying the amount of power absorbed thereby, and means responsive to the phase relation between said synchronous machines for controlling said electric discharge means.

12. In a system of distribution, remotely situated synchronous dynamo-electric machines, a power transmission circuit interconnecting said machines, an auxiliary power generating means connected to supply power to said transmission circuit in combination with one of said synchronous machines, electric discharge means in circuit with said auxiliary power generating means for varying the power supplied to said power circuit, and means responsive to the phase relation between said synchronous machines for controlling said electric discharge means.

13. In a system of distribution, remotely situated synchronous dynamo-electric machines, a power transmission circuit interconnecting said machines, an auxiliary power generating means connected to supply power to said transmission circuit and operated in speed and phase independent of said synchronous machines, electric discharge means connected in circuit with said auxiliary power generating means, and means responsive to the phase relation between said synchronous machines for controlling said electric discharge means.

14. In a system of distribution, a transmitting station including a dynamo-electric machine, a receiving station including a dynamo-electric machine, a transmission circuit interconnecting said stations, an electric valve operatively associated with said transmitting station for controlling the time-phase position of a voltage vector of the dynamo-electric machine of said transmitting station, a saturable reactor for controlling said valve, and means for varying the saturation of said reactor in accordance with relative variations in phase between voltage vectors of said transmitting and receiving station dynamo-electric machines.

15. In a system of distribution, a transmitting station including a synchronous dynamo-electric machine, a receiving station including a synchronous dynamo-electric machine, a power transmission circuit interconnecting said stations, a power absorbing circuit, means including an electric valve for interconnecting said dynamo-electric machine at said transmitting station and said power absorbing circuit, said electric valve having an anode, a cathode and a control grid, a communication channel interconnecting said stations for producing a voltage component in accordance with the angular relation between the terminal voltages of said stations, and means for energizing said control grid in accordance with said voltage component.

16. In a system of distribution, a transmitting station including a synchronous generator, a receiving station including a synchronous dynamo-electric machine, a power transmission circuit interconnecting said stations, a power absorbing circuit, rectifying means including a vapor electric discharge device for interconnecting said generator and said power absorbing circuit, said discharge device having an anode, a cathode and a control grid, inverting means interposed between said rectifying means and said power absorbing circuit, an impedance network for producing a voltage component proportional to and substantially in quadrature relation with said generator voltage, an impedance network for producing a voltage component proportional to the terminal voltage of said dynamo-electric machine and substantially in phase opposition to said generator voltage component when said generator and said dynamo-electric machine are in synchronous relation, a pilot wire circuit interconnecting the output terminals of said impedance network and connected to energize said control grid, and means responsive to direct current transients in the output circuit of said rectifying means for modifying the voltage component derived from said second mentioned impedance network in a manner to prevent power oscillations in the power absorbing circuit.

17. In a system of distribution, a transmitting station including a synchronous generator, a receiving station including a synchronous dynamo-electric machine, a power transmission circuit interconnecting said stations, a power absorbing circuit, rectifying means including a vapor electric discharge device for transmitting power from said generator to said power absorbing circuit, said discharge device having an anode, a cathode and a control grid, inverting means interposed between said rectifying means and said power absorbing circuit, an impedance connected to said generator terminals for producing a voltage component proportional to and substantially in quadrature relation with said generator voltage, an impedance network comprising a resistor and a saturable reactor for producing a voltage component proportional to the terminal voltage of said dynamo-electric machine and substantially in phase opposition to said generator voltage component when said generator and said dynamo-electric machine are in synchronous relation, a pilot wire circuit for interconnecting the output terminals of said impedance networks and connected to energize said control grid, a current transformer in the output circuit of said rectifying means, a saturating winding for said saturable reactor connected to be energized from direct current transients in said current transformer for preventing oscillations in said power absorbing circuit.

18. In a system of distribution, a transmitting station bus, synchronous generating means connected to energize said bus, a receiving station bus, synchronous dynamo-electric machines connected to said receiving station bus, a power transmission circuit for interconnecting said buses, a supplementary source of alternating current, rectifying means connected in the output circuit of said supplementary generating means, inverting means connected in the output circuit of said rectifying means and connected to energize said transmitting station bus, means for controlling the output of said rectifying means, a communication channel for producing a control potential in accordance with the departure of the transmitting bus and receiving bus from a synchronous relation, and means responsive to said control potential for controlling said rectifier controlling means.

19. In a system of distribution, a transmitting station bus, synchronous generating means connected to energize said bus, a receiving station bus, synchronous dynamo-electric machines connected to said receiving station bus, a power transmission circuit for interconnecting said buses, a supplementary source of alternating current operated in frequency and phase independent of said synchronous generating means, rectifying means including vapor electric discharge devices connected in the output circuit of said supplementary generating means, each of said vapor electric discharge devices being provided with an anode, a cathode, and a control grid, a synchronous inverter connected in the output circuit of said rectifying means and having its alternating current terminals connected to said transmitting station bus, an impedance network comprising a resistance and a saturable reactor connected to be energized in accordance with the voltage of said transmitting bus and having its output terminals connected to energize the circuit of said control grids, a pair of saturating windings for said saturable reactor, a second rectifying means including an electric discharge device having a control grid for energizing one of said saturating windings, a grid transformer including a primary circuit for energizing said last mentioned grid circuit and a secondary circuit, means for energizing said secondary circuit in accordance with the phase relation between the voltages of said transmitting and receiving buses, and means for energizing said other saturating winding in accordance with direct current transients in the output circuit of said rectifier for preventing oscillations in the power transmitted to said transmitting bus.

In witness whereof, I have hereunto set my hand.

ERNST F. W. ALEXANDERSON.